Sept. 5, 1939.  J. V. C. T. CHRISTENSEN, JR  2,172,331
AIR CONDITIONED PRODUCE STAND
Filed March 23, 1935
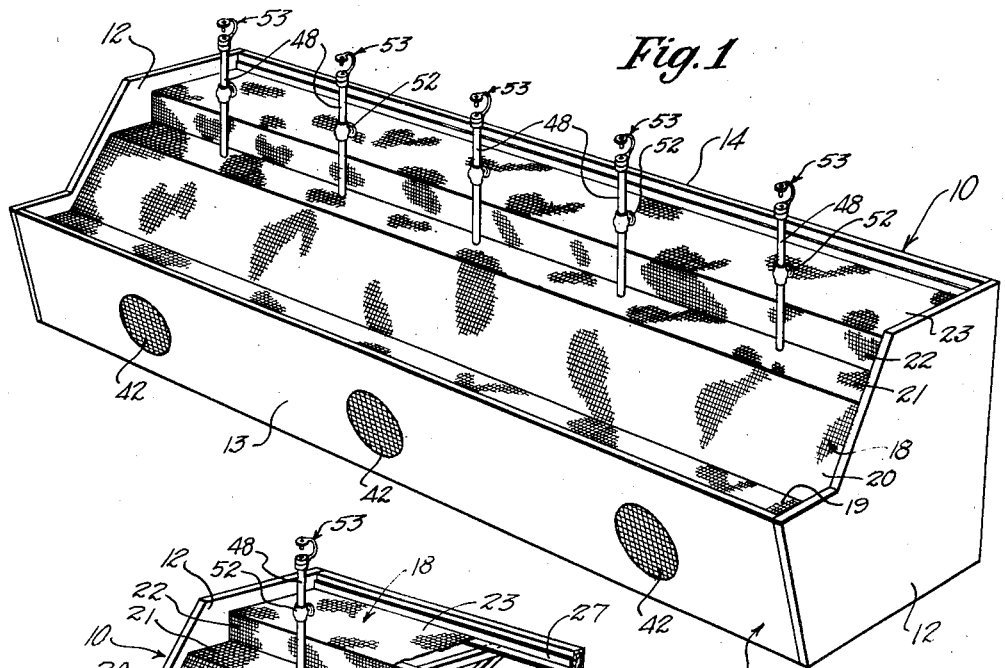
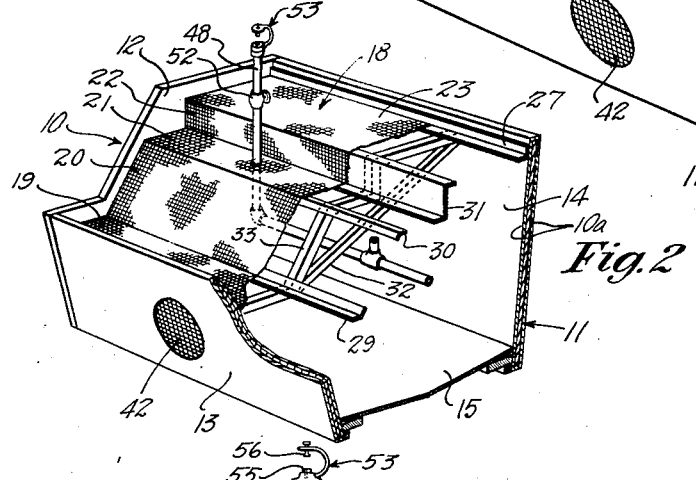
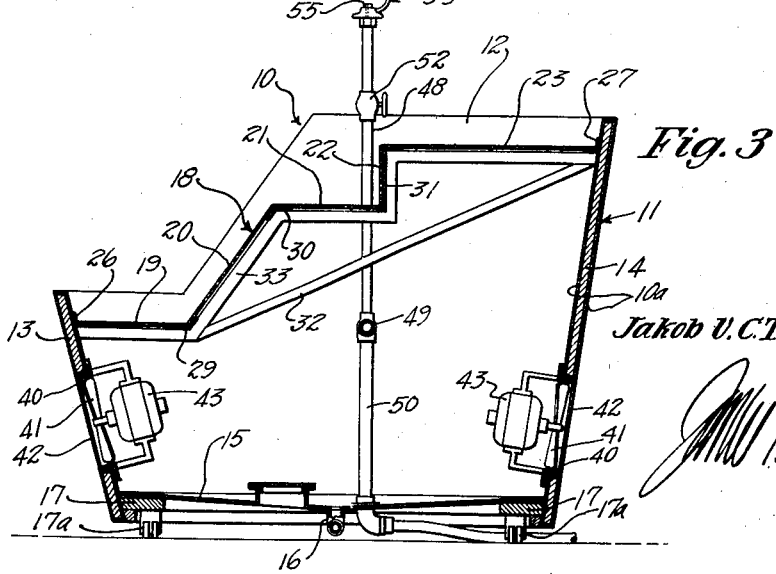
Inventor
Jakob V. C. T. Christensen Jr.
Attorney.

Patented Sept. 5, 1939

2,172,331

UNITED STATES PATENT OFFICE 2,172,331

AIR CONDITIONED PRODUCE STAND

Jakob V. C. T. Christensen, Jr., Long Beach, Calif., assignor to Cecile W. Christensen, Los Angeles, Calif.

Application March 23, 1935, Serial No. 12,615

6 Claims. (Cl. 211—127)

This invention relates generally to vegetable display racks, and more particularly to means for keeping vegetables on a display rack in a fresh and cool condition.

Especially in relatively hot districts, it has been common for vegetable dealers to display vegetables on horizontal or sloping racks, and to attempt to keep them in condition by spraying them constantly with a fine water mist. This has the disadvantage that vegetables on the underside of the pile, or the undersides of individual vegetables, become rather moist, and because of lack of air circulation, there is produced a damp and musty atmosphere about the lower parts of the vegetables that causes them rapidly to lose their freshness and to become stale and moldy. This premature spoilage of course represents substantial loss to the market keeper.

It is therefore a primary object of the present invention to provide a vegetable display rack which will keep the undersides of the vegetables, as well as their upper parts, in a uniformly fresh and crisp condition for a substantially longer period of time than has heretofore been possible.

The rack of the present invention involves a horizontal or sloping vegetable supporting screen member, which closes the upper side of a long box-like supporting member. This supporting member has closed side and end walls, and also a closed bottom wall provided with a water drain. Suction fans are provided in the side walls of this supporting member, and are arranged to suck air out from the compartment below the vegetable screen. Means are provided for spraying a fine water mist downwardly onto the vegetables on the screen. The suction fans then cause a downwardly circulation of air through the slightly moistened vegetables and the supporting screen, and out through the fan openings in the side walls of the supporting structure. This causes a faster evaporation of the mist or water on the vegetables, with the result of lowering their temperature. The atmosphere under the vegetables is thus maintained in a fresh, clean and cool condition, resulting in preservation of the vegetables in a fresh and sweet condition over a longer period of time than is otherwise possible.

The invention will be understood from the following detailed description of a present preferred embodiment thereof, reference for this purpose being had to the accompanying drawing, in which:

Fig. 1 is a perspective view of a vegetable display rack in accordance with the present invention;

Fig. 2 shows a portion of Fig. 1, with parts broken away; and

Fig. 3 is a vertical cross-section of the rack taken through one of the suction fans.

The vegetable rack of the present invention is denoted generally by numeral 10, and embodies a supporting structure or box 11 including vertical end walls 12, front and rear walls 13 and 14, respectively, here shown to slope outwardly somewhat, and a closed bottom 15. The walls are here shown as made up of a pair of sheet metal outside members 10a and an intermediate layer of heat insulation material, such as a cork composition. The particular wall construction employed of course constitutes no limitation on the invention. In the present instance, the back wall 13 is shown as approximately twice the height of front wall 12. Bottom wall 15 slopes downwardly toward the center, and is provided in the center with a water drain pipe 16 (see Fig. 3). At the bottom of the supporting structure are longitudinal members 17, and these may be mounted on supporting rollers 17a.

The vegetable supporting member is in the form of a screen 18, which closes the top side of the walled-in supporting structure 11. It is to be understood, of course, that while the vegetable supporting member is here shown in the form of a screen, any equivalent foraminous or air ventilated wall or supporting structure may be employed, and the expression "screen" as used in certain of the claims contemplates and includes any such equivalent. In the present instance screen 18 is shaped to provide a horizontal portion 19 adjacent front wall 13, this screen portion 19 merging with an upwardly sloping portion 20, which in turn merges with a higher horizontal section 21. Section 21 turns upwardly at its rearward edge to form a vertical portion 22, which joins a third horizontal section 23, the latter meeting rearward wall 11. The front and rear edges of the screen are shown as supported by angle members 26 and 27 secured to walls 13 and 14, respectively, and longitudinally extending angle members 29 and 30, and a third member 31, of cross-section as illustrated, is employed to support the screen between walls 13 and 14. These longitudinally extending members, which may be supported at their ends in any desired manner, are provided at intervals with suitable bracing, as indicated at 32 and 33.

Mounted in circular openings 40 spaced along front wall 12 below screen 18 is a plurality of suction fans 41, here shown as three in number. In Fig. 3 a suction fan 41 is also shown as mounted in rear wall 14, although it is not necessary to place fans in both the front and rear walls of the supporting base. The fans are provided with protection screens 42, and are driven by electric motors 43.

Extending upwardly at suitably spaced intervals through screen section 21 are water supply pipes 48, said pipes being connected at their lower ends to a feeder pipe 49 running longitudinally of the base and supplied by a pipe 50 passing through bottom 15. Pipes 48 have hand control valves 52, and supply water to spray devices 53, which are of a nature to spray a fine water mist downwardly through the air above the vegetables and downwardly on to vegetables supported on screen 18. In the form here indicated, these devices comprise a fine nozzle member 55 adapted to discharge a fine stream of water in an upward direction, and an impact pin 56 alined with said water stream, the impact of the stream on the pin end causing the stream to be broken up into a fine downwardly directed spray. In order to achieve the type of spray desired, the full end of the pin is formed with a slightly concaved surface. The particular characteristics of this spray device are completely set forth and claimed in my copending application entitled Vegetable cooling spray, filed Sept. 13, 1933, Ser. No. 689,244.

The use and operation of applicant's improved produce stand is as follows: The water spray devices 53 are adjusted to spray a fine water mist downwardly through the air above the vegetables and onto the vegetables, and the suction fans are operated continuously, exhausting the air in the enclosure below the vegetable supporting screen and so creating an atmospheric depression below said screen, and also in the space immediately above it. Due particularly to the lowered pressure, the air above the screen cools, more rapid evaporation is promoted, and the finer water mist evaporates in the air immediately above the vegetables, cooling that air before it comes into contact with the vegetables. The atmospheric depression below and surrounding the vegetable support causes this cooled air, and the water mist remaining in the air above the vegetables, to move downwardly onto, between and through the vegetables, and to pass off in a downward direction through the screen and through the interior of the enclosure below the screen to be expelled by the suction fans. As stated above, the fine mist evaporates rapidly in the air above the vegetables and so cools the air before it comes into contact with the vegetables. This cooled air, then sucked downwardly through the vegetables, cools the vegetable pile from top to bottom, and also pulls the water mist downwardly through the vegetables. The water so brought into contact with the vegetables prevents them from being dehydrated, and by evaporation, further greatly promoted by the constant downward circulation of air, maintains the vegetables in a fresh and cool condition, with the temperature of the vegetables down in the pile as well as on top materially reduced. It will be evident that my invention effectively prevents direct contact of hot unconditioned air with the vegetables, such as would tend to burn and dry them out, and at the same time cools the pile from top to bottom, while avoiding all possibility of excess accumulation of moisture in the presence of heat toward the bottom of the pile, such as would be conducive to wet rot. The damp air below the vegetables is constantly removed and replaced with fresher air sucked down through the vegetables, so that no accumulation of damp, stagnant atmosphere is possible, and as a result the vegetables are kept in a cool, fresh and sweet condition over relatively longer periods of time than is possible with the use of ordinary vegetable racks unequipped with my air circulation means.

A secondary advantage flowing from the use of my air-conditioned vegetable rack, is that the moisture laden air sucked down through the vegetables and out through the suction fans, is distributed into the market and results in lowering somewhat the temperature of the market atmosphere. The general air conditioning of the market resulting from use of my air circulation vegetable rack is very noticeable. The evaporation of moisture from the air distributed into the market has a general cooling effect on the atmosphere, and the additional moisture in the air tends to settle dust and freshen the appearance of the market.

It will be understood the drawing and description are to be considered as illustrative of and not restrictive on the broader claims appended hereto, for various changes in design, structure and arrangement may be made without departing from the spirit and scope of said claims.

I claim:

1. A vegetable cooling display rack comprising the combination of a bottom wall and side and end walls extending upwardly therefrom, one of said walls having a port therein, a foraminous vegetable supporting member extending across the upper side of the enclosure formed by said walls, a spray head disposed above the foraminous vegetable supporting member and supported on said rack for forming a fine water mist above the vegetables and means for moving the water mist through the air above vegetables piled and supported on the foraminous member and onto the vegetables, to cool the air immediately above the vegetables by evaporation of the fine portion of said mist, said means comprising a suction fan disposed adjacent to said port for exhausting air from the enclosure so that a lower pressure is created under and immediately above the whole of the support and vegetables supported thereon, and drawing the precooled mist laden air above the vegetables downwardly onto and around and between the vegetables and downwardly through the support, and exhausting the mist laden air through said port, so that the vegetables in all parts of the pile are uniformly wetted and cooled by the cooled air and water mist drawn downwardly through and between them and by evaporation of such water from the vegetables.

2. A vegetable cooling display rack comprising the combination of a bottom wall and side and end walls extending upwardly therefrom, one of said walls having a port therein, a foraminous vegetable supporting member extending across the upper side of the enclosure formed by said walls, a spray head disposed above the foraminous vegetable supporting member for forming a fine water mist above the vegetables and means for moving the water mist through the air above vegetables piled and supported on the foraminous member and onto the vegetables, to cool the air immediately above the vegetables by evaporation of the fine portion of said mist, said means comprising a suction fan disposed adjacent to said port for exhausting air from the enclosure so that a lower pressure is created under and immediately above the whole of the support and vegetables supported thereon, and drawing the pre-cooled mist laden air above the vegetables downwardly onto and around and between the vegetables and downwardly through the support, and exhausting the mist laden air through said port, so that the vegetables in all parts of the pile are uniformly wetted and cooled by the cooled air and water mist drawn downwardly through and between them and by evaporation of such water from the vegetables.

3. A produce stand comprising in combination, walls defining a chamber, one of which walls constitutes a support for a bed of produce and has openings forming communication between the bed of produce and said chamber, a water spray device supported in position to deposit mist on the bed of produce, an outlet pasageway through one of said walls, and means communicating with the said passageway for inducing a sub-atmospheric pressure within the chamber to cause movement of air from exterior of the chamber through the bed of produce and into the chamber, said walls forming barriers effectively restricting movement of air into the chamber to that passing through the bed of produce and said openings.

4. A produce stand comprising, in combination, walls, one of which has openings therethrough and forms a support for a bed of produce with which the openings communicate, said walls defining a chamber coextensive with the bed of produce, a water mist spray device supported in position to deposit mist on the bed of produce and means for moving air downwardly through said mist, and the bed of produce, including: an air-outlet passageway through one of said walls and a fan positioned to displace air from the chamber outwardly through the passageway to induce within the chamber a sub-atmospheric pressure, said passageway leading to a point substantially removed from the bed of produce and the air to which the top of the produce bed is immediately exposed, whereby to prevent admixture of the exhausted air with the air moving downwardly through the bed of produce.

5. In combination, a produce stand comprising a box-like structure defining a chamber, an upper wall of said structure embodying a foraminous support for a bed of produce, a wall of said structure other than said upper wall having an air discharge passage extending therethrough and opening to atmosphere at a point remote from the space over said foraminous support, a water spray device adapted to discharge a fine water mist, means for supporting and positioning said water spray device over and above said foraminous support in a position to direct a fine water mist directly over the produce on said support, and a blower mounted in a position to discharge air from said chamber through said air passage to atmosphere and operating to create a sub-atmospheric pressure in said chamber and within said produce bed, and to draw fresh atmospheric air together with gathered mist from said spray device downwardly through the produce bed and foraminous support and into said chamber.

6. In combination, a produce stand comprising a box-like structure defining a chamber, an upper wall of said structure embodying a support for a bed of produce, openings for air entry into said chamber formed solely in said produce support, a wall of said structure other than said upper wall having an air discharge passage extending therethrough and opening to atmosphere, a water spray device adapted to discharge a fine water mist, means for supporting and positioning said water spray device over and above said produce support in a position to direct a fine water mist directly over the produce on said support, and a blower mounted in a position to discharge air from said chamber through said air passage to atmosphere and operating to create a sub-atmospheric pressure in said chamber and within said produce bed, and to draw fresh atmospheric air together with gathered mist from said spray device downwardly through the produce bed and produce support and into said chamber.

JAKOB V. C. T. CHRISTENSEN, JR.